United States Patent
Walsh et al.

(10) Patent No.: US 11,771,100 B2
(45) Date of Patent: *Oct. 3, 2023

(54) SYSTEMS AND METHODS FOR CONTROLLING WATER QUALITY IN FOOD PROCESSING

(71) Applicant: Ecolab USA Inc., St. Paul, MN (US)

(72) Inventors: Richard Joseph Walsh, Woodbury, MN (US); William Coby, Guntersville, AL (US); Oriana Nicole Leishman, St. Paul, MN (US)

(73) Assignee: ECOLAB USA INC., St. Paul, MN (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/534,293

(22) Filed: Nov. 23, 2021

(65) Prior Publication Data

US 2022/0192211 A1 Jun. 23, 2022

Related U.S. Application Data

(63) Continuation of application No. 15/944,273, filed on Apr. 3, 2018, now Pat. No. 11,213,041.

(Continued)

(51) Int. Cl.
*A23B 4/12* (2006.01)
*A23B 4/26* (2006.01)
(Continued)

(52) U.S. Cl.
CPC .............. *A23B 4/12* (2013.01); *A22B 5/0076* (2013.01); *A22B 5/0082* (2013.01); *A22C 17/08* (2013.01);
(Continued)

(58) Field of Classification Search
None
See application file for complete search history.

(56) References Cited

U.S. PATENT DOCUMENTS 4,849,237 A 7/1989 Hurst
5,093,140 A 3/1992 Watanabe
(Continued)

FOREIGN PATENT DOCUMENTS

CN 1879486 A 12/2006
CN 103461273 A 12/2013
(Continued)

OTHER PUBLICATIONS

"Diffusion," Web page <https://en.wikipedia.org/wiki/Diffusion>, 14 pages, Nov. 21, 2016, retrieved from Internet Archive Wayback Machine <https://web.archive.org/web/20161121010427/https://en.wikipedia.org/wiki/Diffusion> on Mar. 22, 2019.

(Continued)

*Primary Examiner* — Patricia A George
(74) *Attorney, Agent, or Firm* — Merchant & Gould P.C.

(57) ABSTRACT

A chiller bath includes a tank for holding a volume of chiller water; a dosing system for dosing a first solution and a second solution into the chiller water, arranged to create a plurality of zones within the volume of water, wherein each zone has a higher concentration of either the first or the second solution than surrounding portions of the volume of water; and a meat or poultry immersion arrangement for immersing and moving carcasses in the chiller water. A method for reducing bacterial load on meat or poultry includes generating a plurality of zones within a chiller bath containing water by dosing a source of alkalinity and antimicrobial into the water, wherein the plurality of zones comprises at least one alkaline zone with a pH above 8.5, and at least one antimicrobial zone with pH below 8.5; and submersing meat or poultry in the bath. The zones can also (Continued)

be generated using spray nozzles in a meat or poultry operation.

18 Claims, 5 Drawing Sheets

Related U.S. Application Data (60) Provisional application No. 62/480,874, filed on Apr. 3, 2017.

(51) Int. Cl.
| | |
|---|---|
| *A23B 4/06* | (2006.01) |
| *A22B 5/00* | (2006.01) |
| *A23B 4/09* | (2006.01) |
| *A23B 4/20* | (2006.01) |
| *A23B 4/24* | (2006.01) |
| *A22C 21/00* | (2006.01) |
| *A23B 4/08* | (2006.01) |
| *A22C 29/00* | (2006.01) |
| *A22C 25/02* | (2006.01) |
| *A22C 17/08* | (2006.01) |

(52) U.S. Cl.
CPC .......... *A22C 21/0061* (2013.01); *A22C 25/02* (2013.01); *A22C 29/00* (2013.01); *A23B 4/062* (2013.01); *A23B 4/08* (2013.01); *A23B 4/09* (2013.01); *A23B 4/20* (2013.01); *A23B 4/24* (2013.01); *A23B 4/26* (2013.01); *A23V 2002/00* (2013.01)

(56) References Cited

U.S. PATENT DOCUMENTS

| | | | |
|---|---|---|---|
| 5,208,057 | A | 5/1993 | Greenley et al. |
| 5,264,229 | A | 11/1993 | Mannig et al. |
| 5,409,713 | A | 4/1995 | Lokkesmoe et al. |
| 5,484,615 | A | 1/1996 | Kounev |
| 5,545,374 | A | 8/1996 | French et al. |
| 5,632,676 | A | 5/1997 | Kurschner et al. |
| 6,514,556 | B2 | 2/2003 | Hilgren et al. |
| 6,545,047 | B2 | 4/2003 | Gutzmann et al. |
| 6,605,253 | B1 | 8/2003 | Perkins |
| 7,316,824 | B2 | 1/2008 | Hilgren et al. |
| 9,414,609 | B1 | 8/2016 | Bullard et al. |
| 11,213,041 | B2 | 1/2022 | Walsh et al. |
| 2004/0067160 | A1 | 4/2004 | Perkins |
| 2005/0244556 | A1 | 11/2005 | Karren |
| 2006/0225439 | A1 | 10/2006 | Morris, III et al. |
| 2011/0136421 | A1 | 6/2011 | Brink et al. |
| 2012/0244261 | A1 | 9/2012 | Harvey et al. |
| 2012/0282851 | A1 | 11/2012 | Hilgren et al. |
| 2016/0058023 | A1 | 3/2016 | Mullen et al. |

FOREIGN PATENT DOCUMENTS

| | | |
|---|---|---|
| JP | 2000166524 A | 6/2000 |
| RU | 2363164 C2 | 8/2009 |
| WO | 02/054866 | 7/2002 |
| WO | 03/101210 A1 | 12/2003 |
| WO | 2007/145783 A2 | 12/2007 |

OTHER PUBLICATIONS

EnviroTech, "The Use of Peracetic Acid at Increased pH Levels".
Falconer, Heather M., Gina Battaglia, and Anthony Carpi, "Diffusion I: An Introduction," 13 pages, 2015, Visionlearning vol. CHE-3(4), 2015, Web page <https://www.visionlearning.com/en/library/ Chemistry/1 /Diffusion-l/216>.
https://envirotech.com/wp-content/uploads/2015/12/PAA-at-Alternate-pHs-V3.pdf; printed 2020, archieved 2016 (Year: 2020).
Invitation to Pay Additional Fees and, Where Applicable, Protest Fee, including a Partial International Search Report, re: PCT/US2018/025892, dated Jul. 18, 2018.
International Search Report and Written Opinion for Application No. PCT/US2018/025892 dated Sep. 14, 2018.
LAS: Liquid Analysis Systems, Inc.: Totally Automated Chemical Process Analysis and Control; published online at least by Jul. 2, 2015 at: https://web.archive.org/web/20150702174516/https://liquidanalysis.com/replenishment-systems.html (Year: 2015).
"pH," Web page <https://en.wikipedia.org/wiki/PH>, 11 pages, Feb. 9, 2013, retrieved from Internet Archive Wayback Machine <https://web.archive.org/web/20130209122931/https://en. wikipedia.org/wiki/PH> on Mar. 22, 2019.
"The Use of Peracetic Acid at Increased pH Levels," Web page <https://envirotech.com/wp-content/uploads/2015/12/PAA-at-Alternate-pHs-V3.pdf>, 4 pages, Dec. 15, 2016, retrieved from Internet Archive Wayback Machine <https://web.archive.org/web/20161215232035/https://envirotech.com/wp-content/uploads/2015/12/PAA-at-Alternate-pHs-V3.pdf> on Mar. 22, 2019.

SYSTEMS AND METHODS FOR CONTROLLING WATER QUALITY IN FOOD PROCESSING

CROSS-REFERENCE TO RELATED APPLICATION

This application is a continuation of U.S. patent application Ser. No. 15/944,273, now U.S. Pat. No. 11,213,041, originally filed Apr. 3, 2018, which claims the benefit of U.S. Provisional Application Ser. No. 62/480,874, filed Apr. 3, 2017, each of which are hereby incorporated by reference in their entirety.

FIELD

The present disclosure relates to sprays and aqueous baths used for immersing poultry and meat carcasses. The present disclosure further relates to systems and methods for disinfecting poultry water, poultry carcasses, and meat carcasses in sprays and aqueous baths.

BACKGROUND

All meat and poultry carcasses entering the processing environment are contaminated with bacteria, some with pathogenic bacteria such as *E. coli* and *Salmonella*. Fecal matter and dirt are the main sources of this contamination. As a result of such contamination, meat and poultry are typically washed at any of several steps during the process of converting a live animal to an edible food product. Such washing aims to remove dirt, offal, blood, viscera, other debris, and microbes from the animal. Removing or reducing microbes aids the safe storage and consumption of meat and poultry, yet many existing washing procedures fail to significantly reduce the microbe burden on the meat or poultry. The potential for animal skin to become cross-contaminated is worsened by the ability of various types of bacteria (Gram-positive, Gram-negative, flagellated, non-flagellated, rods or cocci) to adhere within only 15 seconds of contact. Once in the processing environment, carcasses can become cross-contaminated with pathogens during handling, scalding, mechanical processing, and chilling.

Water used for washing or other procedures is often used repeatedly over time, which provides yet another opportunity spreading, rather than reducing, the microbial burden on meat and poultry. For example, the water may become contaminated with organic matter and microbes from a carcass, providing nutrients for microbial growth in the water. The microbes can grow on and contaminate additional carcasses and the processing equipment. In particular, water left untreated in a submersion bath tends to decontaminate meat and poultry early in a shift but contaminates carcasses later in the shift. Such water can become a source of microbial contamination or cross contamination during processing.

Microbial contamination or cross contamination of meat and poultry via water continues to be a major concern for processors and end users. Handling or processing steps that pool many individual meat or poultry parts together tend to increase the risk that a single contaminated item may contaminate the entire lot. Immersing or spray-washing meat or poultry in fresh water can help reduce surface populations of microorganisms. However, sterilization by repeated washing, even with sterile water, cannot be achieved because microorganisms within tissues of meat or poultry remain in place.

The microbial quality of sprays and aqueous baths can be controlled using various methods, including various antimicrobial agents, such as chlorine-based antimicrobials, peroxides, non-oxidizing chemistries, high pH, high temperature (e.g., scalding), and low temperature (e.g., chilling). The addition of antimicrobial agents to wash or process water can inactivate vegetative bacteria cells in water, helping to avoid contamination.

In the past, meat or poultry wash or process waters have generally been treated with chlorinated compounds, organic acids, acidified sodium chlorite, trisodium phosphate, or ozone. Generally, these materials are effective in reducing microbial contamination on meat or poultry. Excessive chlorination of food processing water with hypochlorite has prompted concern over production of toxic or carcinogenic organochlorine compounds and other by-products. Other treatments, such as peroxycarboxylic acids and high pH do not suffer from similar drawbacks. However, some antimicrobial strategies that may be effective when used alone, may counteract one another when combined in certain ways. It is against this background that the present disclosure is made.

SUMMARY

A method for reducing bacterial load on meat and poultry in sprays and an aqueous bath is provided. The method includes generating a plurality of zones using spray nozzles or within a chiller bath containing water by dosing a source of alkalinity and a peracid into the water, wherein the plurality of zones comprises at least one alkaline zone with pH above pKa of the peracid, and at least one peracid zone with pH below the pKa of the peracid. The meat or poultry is either sprayed or submersed into the bath and travels through the various zones.

The spray nozzles may be arranged in a number of ways to create zones. For example, the spray nozzles may be part of a spray cabinet or cabinets such as an inside-outside bird washer (IOBW). In some embodiments, the nozzles within a single spray cabinet may be set up such that some nozzles form one zone for dosing a first solution and other nozzles form another zone for dosing a second solution. In some embodiments, multiple spray cabinets may be set up such that all of the nozzles in an entire spray cabinet form one zone for dosing a first solution and all of the nozzles in another spray cabinet form another zone for dosing a second solution. In some embodiments, spray nozzles can be positioned on a processing line without requiring a cabinet framework, for example, when processing large beef carcasses. In these embodiments, the nozzles can be set up such that individual nozzles or collections of nozzles form one zone for dosing a first solution, and other nozzles or collection of nozzles form an additional zone for dosing a second solution.

In some embodiments, a chiller bath may include a tank for holding a volume of chiller water; a dosing system for dosing a first solution and a second solution into the chiller water, arranged to create a plurality of zones within the volume of water, wherein each zone has a higher concentration of either the first or the second solution than surrounding portions of the volume of water; and a poultry immersion arrangement for immersing and moving poultry carcasses in the chiller water.

DETAILED DESCRIPTION

The present disclosure relates to sprays and aqueous baths used for treating meat and poultry carcasses. The present disclosure further relates to systems and methods for disinfecting meat and poultry water and carcasses in sprays and aqueous baths.

The term "about" is used here in conjunction with numeric values to include normal variations in measurements as expected by persons skilled in the art, and is understood to have the same meaning as "approximately" and to cover a typical margin of error, such as ±5% of the stated value.

As used herein, "weight percent," "wt-%," "percent by weight," "% by weight," and variations of the same refer to the concentration of a substance as the weight of the substance relative to the total weight of the composition. The terms "percent" and "%" are intended to be synonymous with "weight percent" and "wt-%" unless specifically otherwise indicated.

The term "substantially free" is used here to indicate that no substantial amounts (e.g., no more than incidental amounts, such as about 0.1%, about 0.5%, about 1%, about 2%, about 3%, or about 5%) of the component are included in the product.

During processing of raw food items, various sprays, washes, rinses, and baths may be used to clean and prepare the food. The raw food items may include meats, fish, seafood, etc., or vegetables or fruit. However, the methods of the present disclosure may be particularly useful in the processing of meat and poultry carcasses. Poultry is understood to include chicken, turkey, ostrich, game hen, squab, and pheasant. Meat is understood to include beef, elk, venison, rabbit, pork, fish (e.g., salmon, shark, sea bass, tuna, grouper, orange roughy, red snapper, trout), and shellfish (e.g., shrimp, crawfish, lobster, crab). The meat can include whole animal carcasses or portions of an animal.

Meat and poultry carcasses may be immersed in water or an aqueous bath during washing and rinsing steps, and during chilling in what is known as a chiller bath. In order to be able to reuse and conserve water in such operations, the microbial quality of the water must be controlled to avoid contamination. Various methods can be employed, including using various antimicrobial agents, such as chlorine-based antimicrobials, peroxides, non-oxidizing chemistries, high pH, high temperature (e.g., scalding), and low temperature (e.g., chilling). However, some antimicrobial strategies that may be effective when used alone, may counteract one another when combined in certain ways.

For example, in some cases the antimicrobial quality of meat or poultry chillers is maintained by adding an alkali to maintain a high pH, and a peroxide compound (e.g., peroxycarboxylic acid ("peracid")) to the chiller water. While both the high pH and the peracid are effective antimicrobials on their own, it has been observed that when the peracid is above its pKa (e.g., above about pH 8), the predominant molecule present is the salt form of the acid, rendering the peracid less effective as an antimicrobial. For example, the chiller bath antimicrobial system may include peracetic acid and an alkaline source to maintain the pH of the bath at about pH 9-11. However, the pKa of peracetic acid is 8.2, and at the pH typically used in the chiller bath, peracetic acid is mainly present as peracetate, which is a less effective antimicrobial. Therefore, the added antimicrobial effect sought from the peracid is at least partially lost when the peracid is added to a high alkaline solution.

According to some embodiments of the present disclosure, an aqueous bath is provided with zones including alternating zones of a first agent and a second agent. For example, the zones may include a first zone (or set of zones) alternating with a second zone (or set of zones), the first zone including the first agent, and the second zone including the second agent. The first agent, second agent, or both work to reduce the microbial population on the meat or poultry or in the bath. Due to the nature of moving counter-flow chiller baths, mixing of the zones may occur throughout the bath. Alternatively, either the first zones or the second zones may include a mixture of both the first agent and the second agent. In one example, the zones include both the first agent and the second agent, but the antimicrobial effect of one of the first and second agents dominates each zone.

Figure 1:
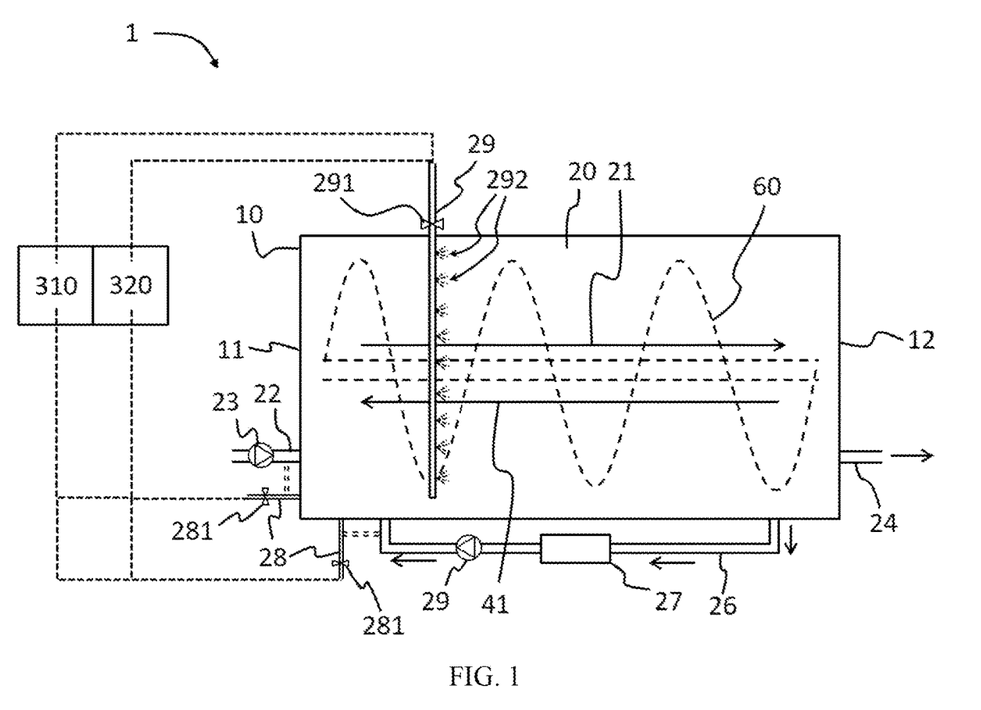
FIG. 1 is a schematic diagram of an aqueous bath according to an embodiment.

A schematic top view of an aqueous bath that can be used in meat or poultry processing is shown in FIG. 1. The aqueous bath 1 can be housed in a tank 10 with a first end 11 and a second end 12. The tank 10 can be sized to house a suitable volume of water for the number of carcasses in the bath at any given time. Water can be added to the tank by a pump 23 through an inlet 22 at the first end 11, causing a flow of bath solution 20 in a first direction 21 from the first end 11 to the second end 12 of the tank 10. The tank 10 may also include a drain 24 at or near the second end 12. The drain 24 may optionally include a strainer and/or filter to remove solids. Carcasses may be introduced into the tank 10 at the second end 12 by any suitable method, and may be advanced in the bath in a direction 41 opposite of the first direction 21 of the flow of bath solution 20. In one example, the carcasses may be fully or partially immersed in the bath solution and may be advanced and/or immersed using an immersion system, such as an auger or paddle 60.

The bath solution 20 may also be circulated through a circulation loop 26, and may be chilled using a chiller 27, for example in the case of a chiller bath. The circulation loop 26 may have a first end in fluid communication with the tank 10 and a second end disposed at the first end 11 of the tank 10. The first end of the circulation loop 26 may optionally be connected to the drain 24 to receive bath solution 20 from the tank 10 through the drain 24. Bath solution 20 may be pumped through the recirculation line by a pump 29 arranged to create a recirculating water flow.

The zones 31, 32 can be created by introducing a first and second agent into the bath solution 20 through a dosing system. The dosing system may include one or more injection points 28, and/or a spray bar 29 with spray nozzles f292 and/or valves supported above the bath 1 connected to lines that draw the first and second agent from a first and second reservoir 310, 320, respectively.

Figure 2:
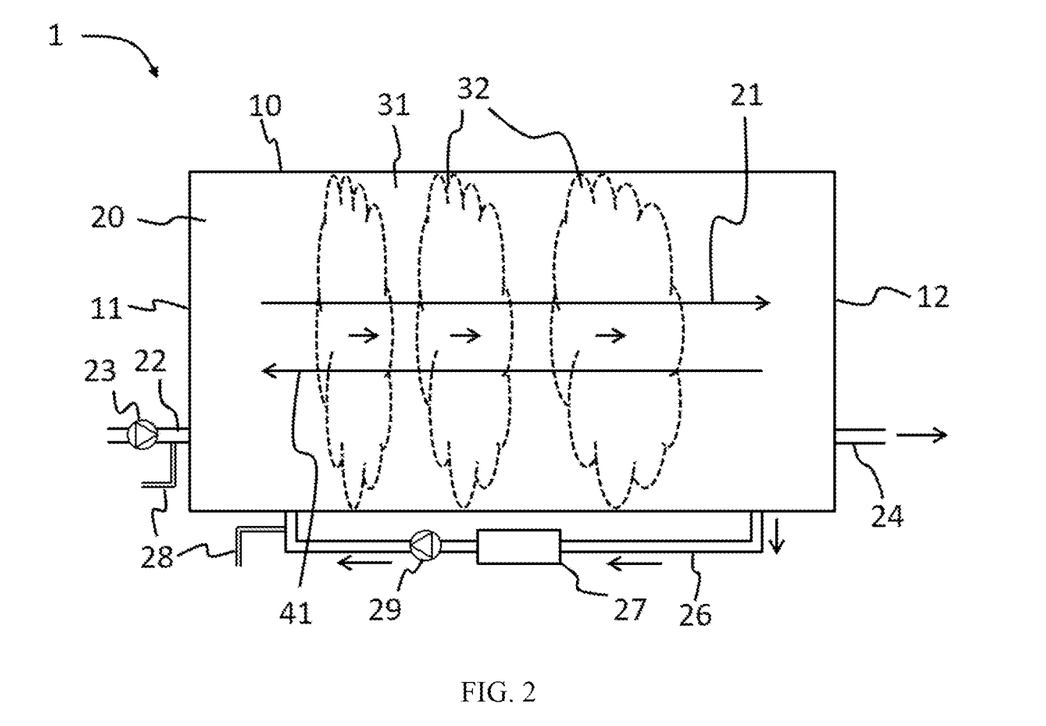
FIG. 2 is a schematic diagram of a method performed in the aqueous bath of FIG. 1 according to an embodiment.

In one embodiment shown schematically in FIG. 2, the first agent is continuously injected into the bath solution to create the first zone 31. The second agent is then pulsed into the bath solution to create intermittent second zones 32. In an exemplary embodiment, the first agent comprises a base, such as an alkali metal hydroxide, and the second agent comprises a peroxygen compound, such as a peroxycarboxylic acid ("peracid"). The concentration of the second agent in the second zone 32 may be higher than the concentration of the first agent to overcome the adverse effects of mixing the agents on the efficacy of the second agent. In an alternative example, the first agent comprises a peroxygen compound, such as a peracid, and the second agent comprises a base, such as an alkali metal hydroxide, and the peroxygen compound is dosed continuously and the base is injected into the bath to create intermittent second zones 32.

The dosing of the agents can be adjusted based on the size of the tank, the desired concentration and/or pH, the desired size of the zone, and whether the agent is dosed directly into the tank 10 or into one of the lines (water inlet 22 or recirculation loop 26). For example, if the tank is set up with dosing one or both of the agents into the recirculation loop 26, the agent can be dosed for up to about 3 seconds (e.g., for less than 1 second), and paused for about 5 to about 20 seconds. In one example, the peracetic acid is dosed into a recirculation loop 26 at a constant rate (e.g., at about 500 to about 5000 ppm, or about 1000 to about 2000 ppm), and a source of alkalinity caustic) is pulsed into the same line at a high concentration (e.g., about 25 to about 50%) in short pulses (e.g., 1 pump stroke every 3-8 seconds, or 2-3 pump strokes every 8 to 20 seconds). The flow rate in an exemplary recirculation line may be from about 25 to 100 gallons per minute, depending on the size of the bath.

Figure 3:
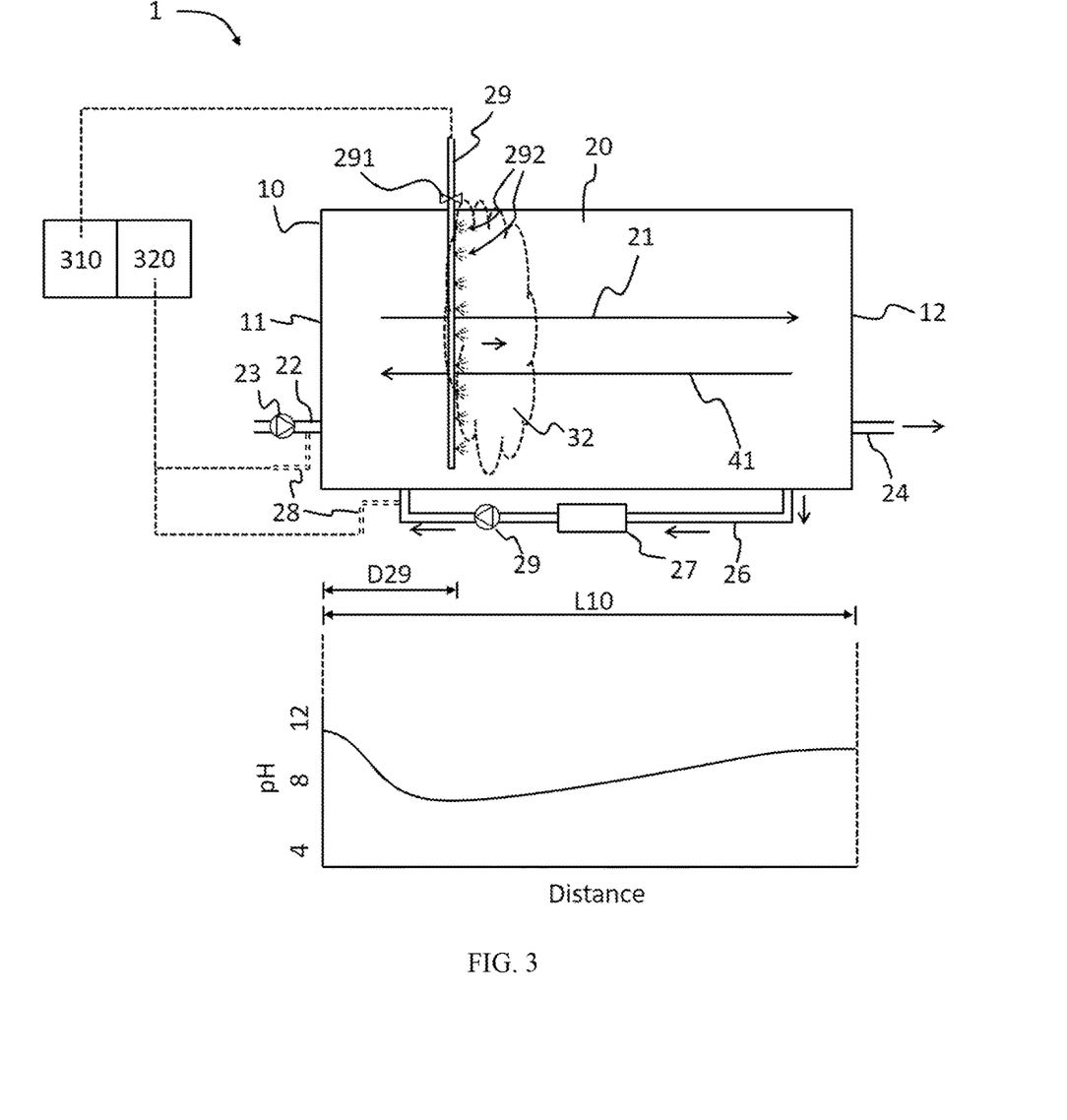
FIG. 3 is a schematic diagram of a method performed in the aqueous bath of FIG. 1 according to an embodiment.

In another embodiment shown schematically in FIG. 3, the first agent is continuously injected into the bath solution to create the first zone 31. The second agent is then sprayed from the spray bar 29 (e.g., from nozzles 292) into the bath solution to create a second zone 32. The spray bar 29 may be positioned at a distance D29 from the first end 11 of the tank 10 that is from about 1/10 to about 1/2, or about 1/5 to about 1/3 of the length L10 of the tank 10. In one example, the spray bar 29 is at a distance D29 that is about 1/4 to about 1/3 of the length L10 of the tank 10.

While FIGS. 1-3 show the peracid solutions dosed into a recirculation loop 26, it is understood that peracid solution, the alkaline solution, or both may be dosed directly into the chiller tank 10 by adding one or more ports at various points along the chiller tank 10. In some embodiments, multiple ports may be added for each zone in order to facilitate an even distribution of solution horizontally and vertically through the chiller. To that end, each zone can include 1-10 ports per zone. One port may be used to provide solution for each zone. Two ports per zone allows for one port to be placed on either side of the chiller and provide a more even distribution of solution in each zone. Multiple ports on the side and going underneath the chiller will provide even more uniform distribution of the solution in each zone by ensuring even distribution from the top of the chiller to the bottom of the chiller and from one side of the chiller to the other. While the ports are intended to inject solution underneath the water surface, it is understood that one or more ports may also optionally be provided above the water surface. In some embodiments, all of the ports are provided under the water surface. An exemplary port includes the PARETO system commercially available from Ecolab Inc. and described in U.S. Patent Application Publication Number 2016/0058023, which is incorporated herein by reference. In some embodiments, the peracid solution and alkaline solution can be added to the chiller tank using a combination of dispensing systems, e.g., ports, spray bars, recirculation lines. The setup of each individual chiller system may determine the optimal combination of dispensing systems.

Due to the flow of bath solution 20 in a first direction 21 and the movement of carcasses in the opposite direction 41, the second zone 32 forms a gradient, where the highest amount of the second agent is near the spray bar 29, and as the second agent gets further mixed into the bath solution 20 and reacts (e.g., neutralizes) with the first agent, the concentration of the second agent becomes lower toward the second end 12 of the tank 10. The movement of the carcasses also causes some mixing of the second agent in the opposite direction. In an exemplary embodiment, the first agent comprises a base, such as an alkali metal hydroxide, which is continuously dosed into the tank, and the second agent comprises a peroxygen compound, such as a peroxycarboxylic acid ("peracid"), which is dosed from a spray bar. The concentration and mixing of base and peracid can be most conveniently demonstrated by graphing the pH in the tank, as in FIG. 3, shown below the schematic of the tank, the distance in the graph corresponding to the distance in the tank. At the first end 11 of the tank 10, the first agent is dosed into the bath and the pH is at its highest, about 9 to about 13. The second agent is dosed from the spray bar 29, and the pH is at its lowest near the spray bar 29, about pH 5 to about 8, or from about pH 6 to about 7.5. The area of the lowest pH extends to both sides of the bar due to flow of the bath solution and the movement of the carcasses. The pH increases from the area of the spray bar 29 toward the second end 12 of the tank 10, reaching about pH 7.5 to about 9.

Figure 4A:
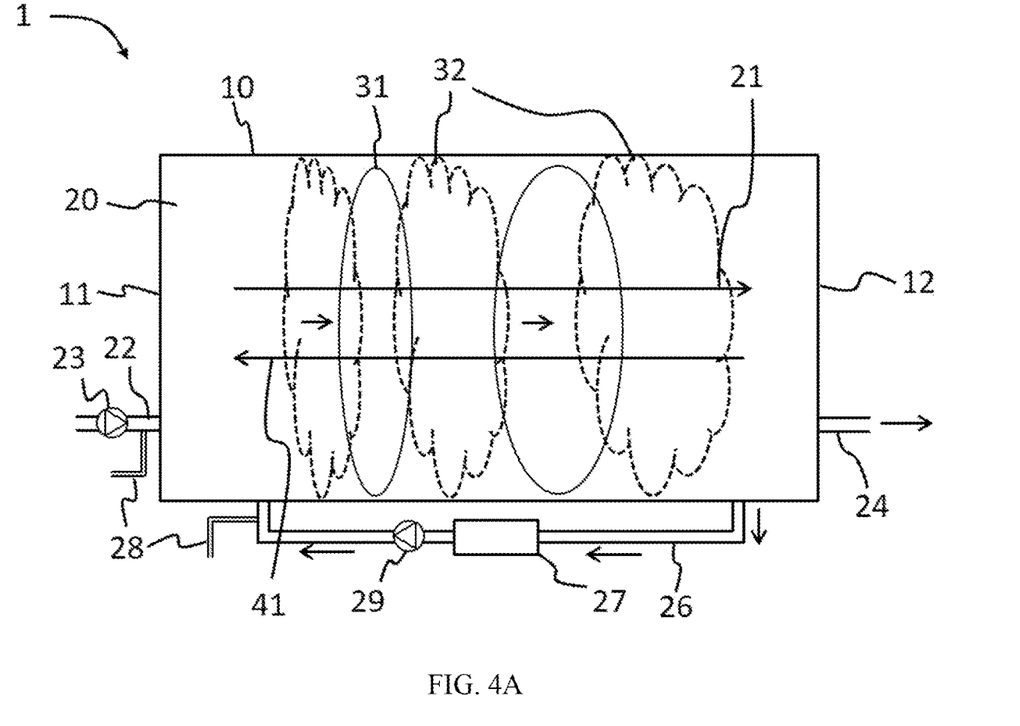
FIGS. 4A and 4B are graphical representations of plug flow according to an embodiment.
Figure 4B:
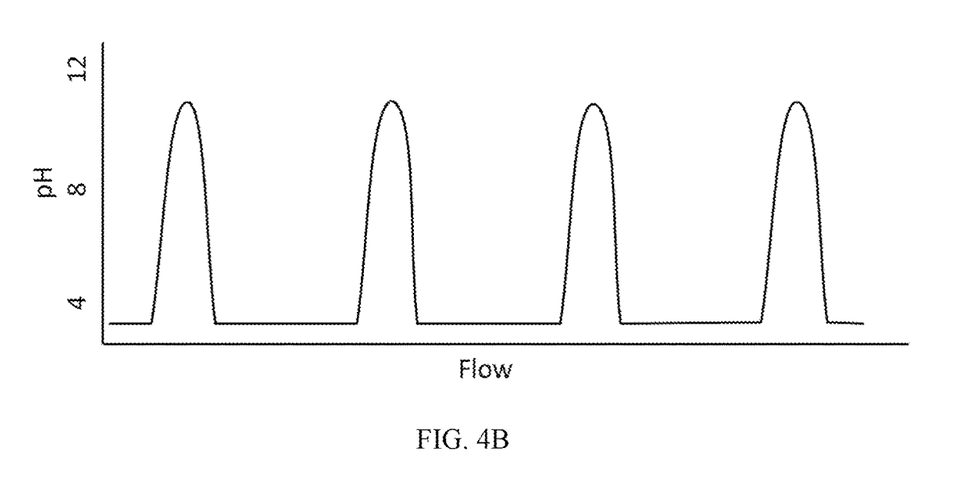

In another embodiment shown schematically in FIGS. 4A and 4B, the first and second agents are injected or pulsed alternatingly into the bath solution to create the first zones 31 and second zones 32. In the example shown, the dosing of the agents is timed so that the zones slightly overlap. Some mixing of the agents will occur in the overlapping areas, and as the zones move through the bath toward the second end 12, the first and second agents gradually become more mixed and the pH across the zones becomes more even.

The first and second agents can be dosed into the bath at intervals that are determined based on the flow rate of bath solution in the bath and the volume of the bath to achieve a desired concentration and size of a zone. In one example, the first agent is a source of alkalinity, and is dosed into the bath at a rate that achieves a pH of about 8 to about 12, about 8.5 to about 11, or about 9 to about 10 within the zone, and the second agent is a peracid that is dosed in to the bath to create zones where the concentration of peracid is from about 25 to about 150 ppm, about 30 to about 100 ppm, or about 35 to about 80 ppm. A suitable strength concentrate can be used to dose in the first and second agents. For example, a source of alkalinity can be dosed as a 1-5% solution at a suitable flow rate, such as about 0.01-1% of the volume of the bath per minute (e.g., about 0.4 to about 40 gallons per minute into a 4000 gallon tank). A peracid can be dosed as a 500 to 5000 ppm solution at a suitable flow rate, such as about 0.01-1% of the volume of the bath per minute (e.g., about 0.4 to about 40 gallons per minute into a 4000 gallon tank).

In some embodiments, the pulsing of one or both of the first and second agents creates plug flows of the first and second agents. A schematic graphical presentation of plug flow in a line (e.g., water inlet 22 or recirculation loop 26) or in the bath is shown in FIG. 4B, where plug flow of a base creates a sharp, intermittent increase in pH in the area of the "plug." Alternatively, the second agent is pulsed in, creating a plug flow of low pH. A similar intermittent increase and decrease can also be observed in the concentration of the first or second agent. When a steady state of operation has been reached, the bath may include at least two of the second zones 32, where the zones near the second end 12 of the tank 10 blend together and are no longer discernible. The first zone 31 may occupy the rest of the space in the bath 1, as shown in FIG. 2, or may also include at least 2 zones, as shown in FIG. 4A.

Figure 5:
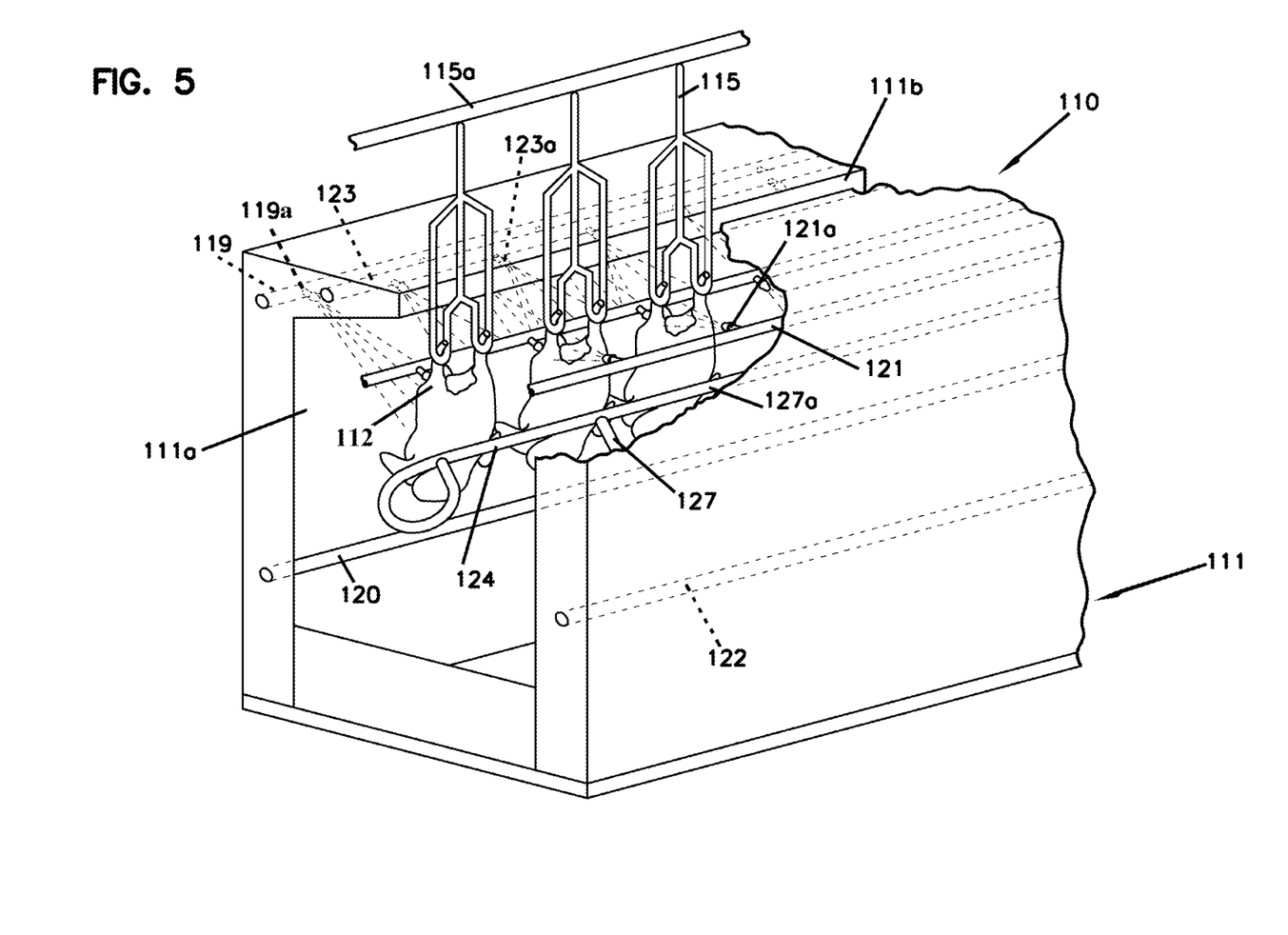
FIG. 5 is a schematic diagram of a method performed in a single spray cabinet according to an embodiment.

In some embodiments, the first and second zones are created using spray nozzles for example along a processing line or in a spray cabinet. FIG. 5 shows an exemplary spray cabinet. The cabinet 110 includes a housing 111 that defines a housing interior 111 a through which the carcasses 112 are conveyed. The housing 111 has a rectangular slot or opening 111 b. The opening 111 b is positioned to allow shackles 115 to be moved, by an overhead conveyor 115 a, through the apparatus 110. The carcass 112 is held in the shackles 115. The overhead conveyor 115 a and shackles 115 are typically permanently positioned in a processing facility. Additional details of an exemplary spray cabinet are shown in U.S. Pat. No. 8,246,429, which is incorporated by reference in its entirety.

The housing 111 includes an inlet manifold that is in fluid communication and provides cleaning solution to five conduits 119-123. Conduits may be added or subtracted and the location of conduits within the housing 111 may change. Conduits may be rotated to allow spray nozzle 119 a-123 a aim adjustment and may be connected to a mechanism that moves the conduits in an oscillating motion. The conduits are supported in the housing interior 111 a by means well known in the art and are not shown. The conduits 119-123 run the length of the first section 116. A plurality of spray nozzles 119 a-123 a are operatively connected to the conduits 119-123 by means well known in the art. Typically, an elbow fitting connects the conduit to the spray nozzle, such construction being well known in the art. The nozzles 119 a-123 a have discharge orifices that diffuse the stream of the cleaning solution. A guide bar 124 is suitably supported in the housing interior to contact the anterior or posterior side of the carcasses to tilt the carcasses from vertical. The guide bar 124 is suitably supported in the housing interior 111 a. The carcass guide bar 124 is connected by suitable means, such as welding, to the support tubes 127.

In some embodiments, the spray cabinet nozzles are divided to form a first zone and a second zone and one or more optional zones. The zones may be formed by alternating individual spray nozzles with peracid solution and alkaline solution. The zones may also be formed by clustering nozzles together to form the first zone, second zone, and optional additional zones. In some embodiments, multiple spray cabinets such as the one shown in FIG. 5 can be placed in series such that one cabinet forms the first zone and another cabinet forms the second zone and additional cabinets can be used to create additional optional zones as desired. In some embodiments, the zones can be created using spray nozzles where the spray nozzles are part of a processing line and not enclosed within a spray cabinet.

The first and second agents can be selected so that they are safe for use with food (e.g., raw meat and poultry), and produce the desired antimicrobial or disinfecting effect. In some embodiments, the first agent is a base. Examples of suitable bases include alkali metal hydroxides, such as sodium hydroxide, potassium hydroxide; and carbonates, such as sodium carbonate or sodium bicarbonate. In one exemplary embodiment, the first agent is sodium hydroxide.

In some embodiments, the second agent is a peroxycarboxylic acid (peracid). Suitable examples of peracids include mono- or di-peroxycarboxylic acids such as peroxyformic acid, peroxyacetic acid, peroxypropionic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, and peroxydodecanoic acid. In one exemplary embodiment, the peracid is peracetic acid, which has a pKa of about 8.2.

Peroxycarboxylic acid can be prepared in situ by mixing carboxylic acid and hydrogen peroxide. The carboxylic acid may be, for example, formic acid, acetic acid, propionic acid, butanoic acid, pentanoic acid, hexanoic acid, heptanoic acid, octanoic acid, nonanoic acid, decanoic acid, undecanoic acid, dodecanoic acid, lactic acid, maleic acid, ascorbic acid, citric acid, hydroxyacetic acid, neopentanoic acid, neoheptanoic acid, neodecanoic acid, oxalic acid, malonic acid, succinic acid, glutaric acid, adipic acid, pimelic acid, or subric acid.

The first and/or second agent may also include additional compounds, such as compounds that help with handling or mixing. Examples of additional compounds include sequestrants, hydrotropes, and thickening or gelling agents. In some embodiments, the first and/or second agent is free or substantially free of additional compounds.

The first and second agents may be dosed into the bath at concentrations that provide an antimicrobial or disinfecting effect. In examples where the first agent is a source of alkalinity, the first agent may be dosed into the bath so that the pH in the first zone is initially (before mixing with the second agent) from about 8.5 to about 13, from 9 to about 12, or form 10 to about 11. The actual dosage of the first agent will depend on the size of the bath and the level of impurities in the bath solution that provide buffering capacity to the water.

In examples where the second agent is a peracid, the second agent may be dosed into the bath so that its concentration in the second zone is initially from about 500 to about 5000 ppm, from 750 to about 3000 ppm, or from 1,000 to about 2,000 ppm. In one example, the second agent is peracetic acid, and the concentration of the second agent in the most concentrated area of the second zone is from about 1,000 to about 1,500 ppm. The pH in the second zone (e.g., in the most concentrated area of the second zone, or in the center of the second zone) may be from about 5 to about 8, or from about 6 to about 7.5.

Test Method for Determining Peracid and Peroxide Levels

The analytical test method used to determine peracid and peroxide levels according to the present disclosure is an iodometric method using starch and iodine indication for presence of an oxidizer. The sample temperature must be below 75° F., sample pH acidic (pH less than 6.2), and include less than or equal to about 1000 ppm in PAA concentration, and less than about 800 pm peroxide. Titration is performed using addition of standardized concentrations of sodium thiosulfate, added dropwise or by other controlled volume delivery mechanism (e.g., an automated pipettor), until the sample changes color from blue/black to colorless (some turbidity may be present). Each controlled addition volume of thiosulfate corresponds to an amount of PAA equivalent. The same sample can be further tested for peroxide content by the addition of an oxygen catalyst, e.g., ammonium molybdate, along with an optional pH adjustment to maintain an acidic pH (e.g., by addition of sulfuric acid). The titration with thiosulfate is repeated. Each controlled addition volume of thiosulfate corresponds to an amount of peroxide. The corresponding amount will be different from peracid due to the difference in molecular mass of each molecule.

When evaluating peroxide/peracid disinfection methods, the method used to measure the amount of peroxide can have an impact on the perceived peroxide level. Certain analytical methods are unsuitable for measurement or peracid/peroxide systems, particularly systems where levels are in flux and not at equilibrium, thus giving erroneous peroxide results.

Some methods in the art report the peroxide level as measured by determining an equilibrium peracid/peroxide concentration and correlating the equilibrium concentration to the peroxide level. However, systems such as poultry chillers, where the peracid and peroxide are in contact with various other components (e.g., byproducts from poultry carcasses, including blood, and catalase enzymes), peracid and peroxide concentrations rarely reach an equilibrium and are in constant flux, with the catalase rapidly degrading the peroxide. If in the analytical method the oxygen catalyst is added before performing the titration to determine the peroxide level, the result indicates the equilibrium peracid/peroxide concentration only, and the peroxide level cannot be accurately determined.

The present disclosure provides a method for reducing bacterial load on meat and poultry, the method comprising: generating a plurality of zones within a chiller bath containing water by dosing a source of alkalinity and peracid into the water, wherein the plurality of zones comprises at least one alkaline zone having a pH above a pKa of the peracid, and at least one peracid zone having a pH below the pKa of the peracid; and submersing meat or poultry in the chiller bath. In certain aspects, the peracid comprises peracetic acid. In certain aspects, the pKa is about 8.2 to about 8.4. The peracid may be peracetic acid. The source of alkalinity may be an alkali metal hydroxide, such as sodium hydroxide. The alkaline zone may have a pH of about 8.5 to about 12, and the peracid zone a pH of about 4 to about 8.5. The peracid may have a concentration of about 500 to about 2000 ppm within the peracid zone when measured under acidic conditions. In certain aspects, the peracid is dosed continuously and the source of alkalinity is dosed intermittently. In certain aspects, the peracid or the source of alkalinity or both are dosed continuously. In certain other aspects, the source of alkalinity and the peracid are dosed alternatingly or intermittently. The source of alkalinity and the peracid may be dosed into a water input line. The source of alkalinity and/or the peracid may be dosed at intervals determined based on a flow rate of water in the chiller and volume of the chiller. The source of alkalinity and the peracid may be dosed to create plug flows of source of alkalinity and of peracid in the water input line. The meat or poultry may be moved in the chiller bath in a first direction, and the plurality of zones moved in a second direction opposite of the first direction. The chiller bath may comprise from one to four peracid zones and from one to four alkaline zones.

A method for reducing bacterial load in a meat or poultry chiller bath is provided, where the chiller bath comprising a water input line, the method comprising: alternatingly dosing a source of alkalinity and a peracid into the water input line; and generating a plurality of zones in the chiller bath, the plurality of zones comprising at least one alkaline zone having a pH above a pKa of the peracid, and at least one peracid zone having a pH below the pKa of the peracid. In certain aspects, the pKa is about 8.2 to about 8.4. The peracid may be peracetic acid. The source of alkalinity may be an alkali metal hydroxide, such as sodium hydroxide. The alkaline zone may have a pH of about 8.5 to about 12, and the peracid zone a pH of about 4 to about 8.5. The peracid may have a concentration of about 500 to about 2000 ppm within the peracid zone when measured under acidic conditions. In certain aspects, the peracid is dosed continuously and the source of alkalinity is dosed intermittently. In certain aspects, the peracid or the source of alkalinity or both are dosed continuously. In certain other aspects, the source of alkalinity and the peracid are dosed alternatingly or intermittently. The source of alkalinity and the peracid may be dosed into a water input line. The source of alkalinity and/or the peracid may be dosed at intervals determined based on a flow rate of water in the chiller and volume of the chiller. The source of alkalinity and the peracid may be dosed to create plug flows of source of alkalinity and of peracid in the water input line. The meat or poultry may be moved in the chiller bath in a first direction, and the plurality of zones moved in a second direction opposite of the first direction. The chiller bath may comprise from one to four peracid zones and from one to four alkaline zones.

The present disclosure also provides a chiller bath comprising: a tank for holding a volume of chiller water, the tank comprising a bottom and walls defining a first end and a second end; one or more water lines operatively connected to one or more pumps for pumping water into the tank and creating a direction of flow of water from the first end to the second end, the one or more water lines comprising a make-up water inlet at the first end of the tank; a dosing system for dosing a first solution and a second solution into the chiller water, the dosing system arranged to create a plurality of zones within the volume of water, wherein each zone has a higher concentration of either the first or the second solution than surrounding portions of the volume of water; and a meat or poultry immersion arrangement for immersing and moving meat or poultry carcasses in the chiller water in a meat or poultry flow direction from the second end of the tank to the first end of the tank. The chiller bath may further comprise a drain at the second end of the tank and a recirculation line for circulating the chiller water in the tank, the recirculation line having a first end in fluid communication with the drain and a second end disposed at the first end of the tank, the recirculation line comprising a pump arranged to create a recirculating water flow from the first end to the second end of the recirculation line and from the first end of the tank to the second end of the tank. The dosing system may comprise a first dosing pump operatively connected to a first inlet, and a second dosing pump operatively connected to a second inlet, wherein the first and second inlets are in the recirculation line. The dosing system may comprise a first dosing valve operatively connected to a first inlet, and a second dosing valve operatively connected to a second inlet, wherein the first inlet is in the recirculation line and the second inlet is in the tank adjacent the first end. The dosing system may comprise a first dosing valve operatively connected to a first inlet, and a second dosing valve operatively connected to a second inlet, wherein the first and second inlets are in the one or more water lines. According to some aspects, the dosing system comprises a first dosing valve operatively connected to a first inlet, and a second dosing valve operatively connected to a second inlet, wherein the first inlet is in the one or more water lines and the second inlet is in the tank adjacent the first end. The one or more water lines may comprise a cold water line connected to a cooling system, wherein the dosing system comprises a first dosing valve operatively connected to a first inlet, and a second dosing valve operatively connected to a second inlet, and wherein one or both of the first and second inlets are in the cold water line. In some aspects the dosing system comprises a first dosing valve operatively connected to a first inlet, and a second dosing valve operatively connected to a second inlet, wherein the first and second inlets are in the tank adjacent the first end. The dosing system may comprise a first dosing valve operatively connected to a first inlet, and a second dosing valve operatively connected to a second inlet, wherein the first inlet comprises a plurality of nozzles positioned on a spray bar extending across the tank in a direction transverse to the direction of flow of water. The dosing system may comprise a first dosing valve operatively connected to a first inlet, and a second dosing valve operatively connected to a second inlet, wherein the first and second inlets are positioned along the bottom or walls of the tank within the volume of chiller water. The dosing system may comprise a first dosing valve operatively connected to a first inlet, and a second dosing valve operatively connected to a second inlet, wherein each of the first and second inlets comprise a plurality of inlet ports disposed along the walls and the bottom of the tank. The dosing system may comprise a first dosing valve operatively connected to a first inlet, and a second dosing valve operatively connected to a second inlet, wherein each of the first and second inlets comprise a plurality of inlet ports disposed in a U-shaped area along the walls and the bottom of the tank, wherein the U-shaped area approximately corresponds to a cross section of the tank in a direction transverse to the recirculating water flow.

A method for reducing bacterial load in a meat or poultry spray operation is provided, the method comprising: alternatingly spraying a source of alkalinity and a peracid on to a meat or poultry carcass; and creating a plurality of zones using spray nozzles along a processing line or in one or more spray cabinets, the plurality of zones comprising at least one alkaline zone having a pH above a pKa of the peracid, and at least one peracid zone having a pH below the pKa of the peracid. In certain aspects, the pKa is about 8.2 to about 8.4. The peracid may be peracetic acid. The source of alkalinity may be an alkali metal hydroxide, such as sodium hydroxide. The alkaline zone may have a pH of about 8.5 to about 12, and the peracid zone a pH of about 4 to about 8.5. The peracid may have a concentration of about 500 to about 2000 ppm within the peracid zone when measured under acidic conditions. In certain aspects, the peracid zone includes 1 to 200, 1 to 100, 1 to 50, 1 to 20, 1 to 10, 1 to 5, 2 to 4, or 2 to 3 spray nozzles and the alkaline zone includes 1 to 200, 1 to 100, 1 to 50, 1 to 20, 1 to 10, 1 to 5, 2 to 4, or 2 to 3 spray nozzles. In some embodiments, the number and configuration of nozzles allows for each solution to remain in contact with the surface of the carcass for a period of time referred to as "dwell time." In some embodiments, the "dwell time" for each zone is from about 5 to about 60 seconds, from about 5 to about 40 seconds, or from about 10 to about 30 seconds. In some embodiments, the dwell time is calculated based on the amount of time a carcass spends in one zone before moving on to the next. In some embodiments, the dwell time is calculated based on the total amount of time that the carcass spends exposed to each zone. For example, in embodiments, where the nozzles alternative between peracid nozzles and alkalinity nozzles, the dwell time for exposure to the peracid solution can be calculated by adding together the time that the carcass is exposed to all peracid nozzles along a line or in a spray cabinet. Likewise, in that same embodiment, the dwell time for the alkalinity nozzles can be calculated by adding together the time that the carcass is exposed to all alkalinity nozzles along a line or in a spray cabinet. In certain aspects, the peracid zone and the alkaline zone are formed by alternating individual nozzles with a source of peracid and a source of alkalinity. In certain aspects, the spray nozzles are part of a processing line. In certain aspects, the spray nozzles are part of a single spray cabinet. In certain aspects, a single spray cabinet forms the peracid zone and a second spray cabinet forms the alkaline zone. The meat or poultry moves past the spray nozzles while hanging from hooks connected to a chain, belt or conveyor system. As the meat or poultry passes by the spray nozzles, the carcass is exposed to both the peracid zone and the alkaline zone. The spray nozzles may be configured in a way to create from one to four peracid zones and from one to four alkaline zones.

The present disclosure also provides a spray system comprising: a plurality of shackles attached to a conveyor system in a meat or poultry processing facility, a plurality of spray nozzles directed to spray peracid solution or alkaline solution at the exterior or interior of the meat or poultry carcass, and a dosing system for dosing a first solution and a second solution into the spray nozzles, the dosing system arranged to create a plurality of zones within the spray nozzles by providing first solution to a portion of the spray nozzles that form the first zone and providing the second solution to a portion of the spray nozzles that form the second zone. According to some aspects, the spray system can include one or more spray cabinets with nozzles inside of the spray cabinet for spraying the exterior or interior of a meat or poultry product. In some embodiments, the spray nozzles inside of a single cabinet are divided into zones for a peracid solution and an alkaline solution. In some embodiments, a first spray cabinet is designated for the peracid solution and a second spray cabinet is designated for the alkaline solution. Additional cabinets may be placed to form additional zones. The order of the zones could be peracid-alkaline and so on or alkaline-peracid and so on.

The present disclosure has described using chiller tanks and spray cabinet systems. It is understood that zones can also be created on other types of carcass processing equipment including augers and conveyors for processing primal and subprimal cuts of meat and meat grinding equipment. The zones can be created by using sprays, flumes, dips, foams, cascades, or stream.

The present disclosure has been described with a reference to peracid and alkaline solutions. In some embodiments, the peracid solution can be replaced with an alternative antimicrobial as part of an "antimicrobial zone" such as sodium hypochlorite, hypochlorous acid, chlorine, or acidified sodium chlorite. In some embodiments, the antimicrobial for the antimicrobial zone is an oxidizing antimicrobial. The concentration of the antimicrobial in a chiller bath or coming out of a spray nozzle can range from about 25 to about 150 ppm, about 30 to about 100 ppm, or about 35 to about 80 ppm, or about 500 to about 5000 ppm, about 750 to about 3000 ppm, or about 1,000 to about 2,000 ppm.

In some embodiments, the method includes additional zones other than a peracid zone and an alkaline zone. For example, the method can include a peracid zone, an alkaline zone, and an additional antimicrobial zone that does not include a peracid.

EXAMPLES

Example 1

A chiller bath at a poultry processing plant was outfitted with caustic dosing into an inlet line adjacent a first end of the bath, and peracetic acid dosing through a spray bar mounted above the bath as schematically shown in FIG. 3. The chiller bath did not include a recirculating line. Poultry carcasses were introduced into the bath at the second end and moved from the second end of the bath to the first end as bath solution flowed from the first end to the second end.

The pH of the bath solution was monitored, and it was observed that near the first end (dosing point of caustic), pH of the bath solution was about 10.5. Just after the dosing point of the peracetic acid, pH of the bath solution dropped sharply to about pH 7.1-7.3. The pH then gradually increased to about 7.9 near the second end of the bath. It was concluded that the spray bar could be used to create separate zones where in one zone the caustic and high pH dominates, and in another zone, peracetic acid dominates.

While certain embodiments have been described, other embodiments may exist. While the specification includes a detailed description, the scope of the present disclosure is indicated by the following claims. The specific features and acts described above are disclosed as illustrative aspects and embodiments. Various other aspects, embodiments, modifications, and equivalents thereof which, after reading the description herein, may suggest themselves to one of ordinary skill in the art without departing from the spirit of the present disclosure or the scope of the claimed subject matter.

What is claimed is:

1. A method for reducing bacterial load on meat or poultry, the method comprising:
    generating a plurality of zones within a chiller bath containing water by adding a source of alkalinity and a peracid into the water, wherein the plurality of zones comprises at least one alkaline zone having a pH above a pKa of the peracid, and at least one peracid zone having a pH below the pKa of the peracid;
    submersing meat or poultry in the chiller bath;
    transporting the meat or poultry carcass from a first end of the chiller bath to a second end of the chiller bath;
    exposing the meat or poultry to the alkaline zone for a first dwell time; and
    exposing the meat or poultry to the peracid zone for a second dwell time.

2. The method of claim 1, wherein the peracid comprises peracetic acid.

3. The method of claim 1, wherein the pKa is about 8.2 to about 8.4.

4. The method of claim 1, wherein the alkaline zone has a pH of about 8.5 to about 13.

5. The method of claim 1, wherein the peracid zone has a pH of about 4 to about 8.5.

6. The method of claim 1, wherein the alkaline zone has a pH of about 9 to about 13 and the peracid zone has a pH of about 4 to about 7.5.

7. The method of claim 1, wherein the peracid has a concentration of about 25 to about 150 ppm within the peracid zone when measured under acidic conditions.

8. The method of claim 1, wherein the peracid is added continuously and the source of alkalinity is added intermittently.

9. The method of claim 1, wherein the peracid is added continuously, the source of alkalinity is added continuously, or both.

10. The method of claim 1, wherein the source of alkalinity and the peracid are added alternatingly or intermittently.

11. The method of claim 1, wherein the source of alkalinity and the peracid are added into a water input line.

12. The method of claim 1, wherein the source of alkalinity is added at intervals determined based on a flow rate of water in the chiller and volume of the chiller.

13. The method of claim 1, wherein the peracid is added at intervals determined based on a flow rate of water in the chiller and volume of the chiller.

14. The method of claim 10, wherein the source of alkalinity and the peracid are added to create plug flows of source of alkalinity and of peracid in the water input line.

15. The method of claim 1, wherein the meat or poultry are moved in the chiller bath in a first direction, and the plurality of zones move in a second direction opposite of the first direction.

16. The method of claim 1, wherein the chiller bath comprises from one to four peracid zones and from one to four alkaline zones.

17. The method of claim 1, wherein the peracid is applied through a spray bar over the top of the chiller.

18. The method of claim 1, wherein the peracid is applied through a port in a side or bottom of the chiller.

* * * * *